May 5, 1942.  W. J. MATTOX  2,282,231
SEPARATION OF AROMATIC HYDROCARBONS
Filed April 19, 1941
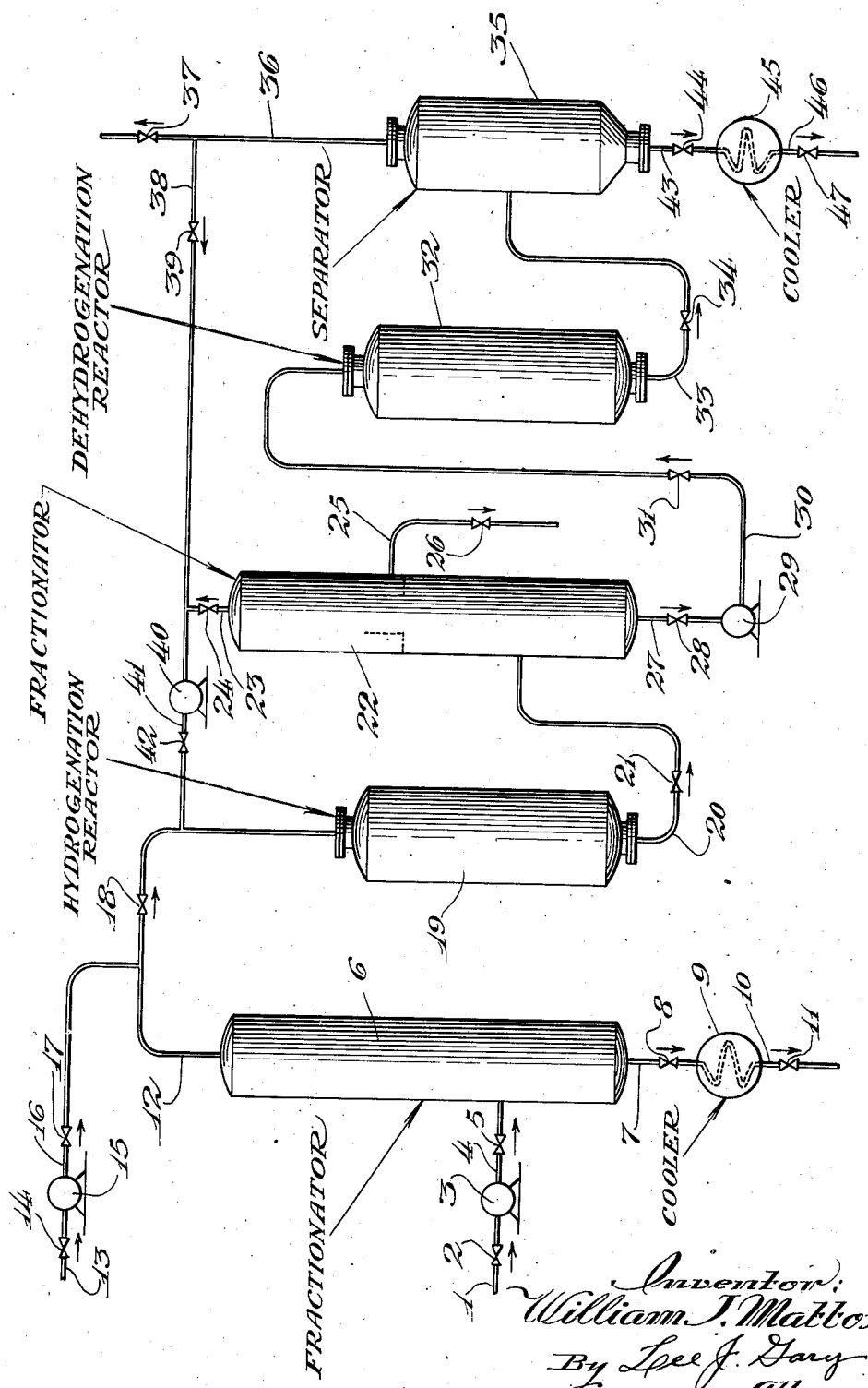
Inventor:
William J. Mattox
By Lee J. Gary
Attorney.

Patented May 5, 1942

2,282,231

UNITED STATES PATENT OFFICE 2,282,231

SEPARATION OF AROMATIC HYDROCARBONS

William J. Mattox, Chicago, Ill., assignor to Universal Oil Products Company, Chicago, Ill., a corporation of Delaware Application April 19, 1941, Serial No. 389,448

9 Claims. (Cl. 260—674)

This invention relates to a process for separating ethyl benzene from isomeric xylenes. More specifically the process is concerned with a combination of chemical and physical methods for separating ethyl benzene from m- and p-xylenes which are often present in hydrocarbon fractions containing ethyl benzene.

Because of the very small differences between the boiling points of ethyl benzene and m- and p-xylenes, separation of these aromatic hydrocarbons can not be made efficiently by means of fractional distillation. Other commercial methods of effecting such separations are either not known or have not been put into general use. In the case of o-xylene, this isomer boils from 5° to 8° C. (9° to 14° F.) higher than ethyl benzene and the other xylenes and therefore can be substantially separated therefrom by distillation.

Since ethyl benzene has now become a highly important compound in industrial manufacturing processes and especially in the production of styrene, the latter being used in the manufacture of resins, a suitable method is needed for separating ethyl benzene from the xylenes which either occur with it in distillates obtained from coal tar, or are formed simultaneously in manufacturing processes as by the dehydrogenation and cyclization of aliphatic hydrocarbons to yield aromatic hydrocarbons.

In one specific embodiment the present invention comprises a process for separating ethyl benzene from a mixture comprising essentially ethyl benzene and isomeric xylenes which comprises fractionally distilling said mixture to remove a relatively lower boiling fraction containing m- and p-xylenes and ethyl benzene from a residue of higher boiling o-xylene, subjecting said relatively lower boiling fraction to catalytic hydrogenation to form a naphthenic hydrocarbon mixture including ethyl cyclohexane and dimethyl cyclohexanes, separating said naphthenic hydrocarbon mixture by distillation into dimethyl cyclohexanes and an ethyl cyclohexane fraction, catalytically dehydrogenating said ethyl cyclohexane fraction to give ethyl benzene and a hydrogen-containing gas, and recycling said hydrogen-containing gas to further use in the hydrogenation of an additional quantity of the fraction comprising essentially m and p-xylenes and ethyl benzene being charged to the hydrogenation step of the process.

The process of this invention for separating ethyl benzene from the isomeric xylenes makes use of the differences between the boiling points of these aromatic hydrocarbons and the boiling points of the corresponding naphthenic hydrocarbons produced therefrom by hydrogenation. These different boiling points are indicated in the following table:

| Aromatic hydrocarbon | Boiling point of aromatic hydrocarbon | Boiling point of corresponding naphthenic hydrocarbon |
| --- | --- | --- |
|  | ° C. | ° C. |
| Ethyl benzene | 136 | 132 |
| p-xylene | 138 | 120 |
| m-xylene | 139 | 121 |
| o-xylene | 144 | 129 |

Ethyl benzene and also some m- and p-xylenes are separated from the higher boiling o-xylene by fractional distillation. Since ethyl benzene boils about 8° lower than o-xylene, this separation is readily accomplished. The remaining mixture containing ethyl benzene and m- and p-xylenes is then hydrogenated by any of several well-known hydrogenation processes to give a commingled mixture of ethyl cyclohexane and m- and p-dimethyl cyclohexanes. The resulting ethyl cyclohexane, which boils from 11 to 12° C. higher than the m- and p-dimethyl cyclohexanes, remains after the dimethyl cyclohexanes are removed by fractional distillation and then the ethyl cyclohexane is dehydrogenated in the final step of the process to yield ethyl benzene. The hydrogen liberated in this dehydrogenation treatment is returned to the hydrogenation stage of the process for further use in converting aromatic hydrocarbons into naphthenic hydrocarbons. As desired, the dimethyl cyclohexanes so separated from ethyl cyclohexane may or may not be reconverted into xylenes by dehydrogenation.

A number of catalysts may be employed for effecting the hydrogenation and dehydrogenation treatments used in effecting the aromatic hydrocarbon separation process as hereinafter set forth. At temperatures of from about 100° to about 150° C. the aromatic nucleus may be hydrogenated readily in the presence of nickel catalysts with substantially no isomerization of the products or formation of secondary reaction products and therefore the yield of desired naphthenic hydrocarbon is practically quantitative.

A very efficient nickel catalyst has been prepared by precipitating basic nickel carbonate in the presence of diatomaceous earth by adding sodium carbonate solution to a solution of nickelic sulfate. The resulting precipitate is then washed free from sulfates, dried, heated to decompose nickel carbonate, and finally reduced with hydrogen to form a catalyst containing about 65% nickel and about 35% diatomaceous earth. Such catalysts containing nickel operate usually at temperatures of from about 50° to about 200° C. and under a pressure of from substantially atmospheric to 100 or more atmospheres.

The hydrogenation stage of the present process may also be carried out in the process of other forms of nickel such as "Raney" nickel, other supported nickel catalysts, other catalysts containing copper, iron, cobalt, platinum, palladium, chromium, molybdenum, etc., as metals or as metal oxides either alone or in admixture with nickel or with supporting materials such as alumina, magnesia, etc. For example, an efficient hydrogenation catalyst comprises oxides of copper and chromium either with or without the addition of small percentages of nickel even as low as 0.001 to 0.2%. Catalysts of the types indicated are active for the hydrogenation of aromatic hydrocarbons when operating at temperatures of from about 200° to about 350° C. and under a pressure of approximately 100 atmospheres of hydrogen.

A rather wide variety of catalysts may be used for dehydrogenating ethyl cyclohexane to ethyl benzene or, when desired, for converting the di-methyl cyclohexanes into isomeric xylenes. At temperatures varying from about 250° to about 600° C. and at substantially atmospheric pressure or under a slightly elevated pressure, nickel catalysts of the types described above for hydrogenation have been found active and efficient for dehydrogenation. In addition to these nickel catalysts, various metal oxides may be used, particularly such oxides as those of metals in the left-hand columns of groups V and VI of the periodic table and especially oxides of vanadium, chromium, and molybdenum, or oxides of zinc, aluminum, magnesium, etc. used either alone, in mixtures with each other, or deposited upon suitable supports or carriers.

For the purpose of illustrating the process of the present invention, the attached drawing shows diagrammatically one form of an apparatus in which the various steps may be carried out for separating ethyl benzene from a mixture containing ethyl benzene and isomeric xylenes.

Referring to the drawing, a hydrocarbon mixture containing ethyl benzene and xylenes is introduced through line 1 and valve 2 to pump 3 which discharges through line 4 and valve 5 into fractionator 6 of conventional design in which a mixture comprising essentially ethyl benzene, m- and p-xylenes is separated from relatively higher boiling o-xylene, the latter material being withdrawn from fractionator 6 through line 7, valve 8, cooler 9, line 10, and valve 11 to storage or to further treatment or use as desired. The mixture comprising essentially ethyl benzene and m- and p-xylenes is directed from fractionator 6 through line 12, therein commingled with at least three molecular proportions of hydrogen introduced through line 13 and valve 14 to compressor 15 which discharges through line 16 and valve 17 into line 12 and thence passes through valve 18 into hydrogenation reactor 19 preferably containing a fixed bed hydrogenation catalyst such as one of those hereinabove set forth and operated at such a temperature and pressure that substantially all of the aromatic hydrocarbons introduced thereto are converted into the corresponding naphthenic hydrocarbons with substantially no decomposition, cracking, or other undesirable side reactions.

The products from hydrogenation reactor 19 are directed therefrom through line 20 and valve 21 to fractionator 22 of conventional design in which a hydrogen-containing gas, a di-methyl cyclohexane fraction, and ethyl cyclohexane are substantially separated. The hydrogen-containing gas is directed from fractionator 22 through line 23 and valve 24 to line 38 through which it is recycled to commingle with the materials charged to hydrogenation reactor 19. A substantially di-methyl cyclohexane fraction is withdrawn from fractionator 22 through line 25 and valve 26 to cooling and storage, not shown, or to any other desired use. A substantially ethyl cyclohexane fraction is directed from the bottom of fractionator 22 through line 27 and valve 28 to pump 29 which discharges through line 30 and valve 31 into dehydrogenation reactor 32 containing a catalyst suitable for converting ethyl cyclohexane into ethyl benzene and hydrogen with substantially no cracking or decomposition into undesired products.

The products from dehydrogenation reactor 32 are directed through line 33 and valve 34 to gas separator 35 in which a gas comprising essentially hydrogen is separated from ethyl benzene. The hydrogen-containing gas is withdrawn from gas separator 35 through line 36 containing valve 37. While part of the hydrogen-containing gas may be discharged through valve 37, at least a portion of said gas is directed through recycle line 38 and valve 39 to compressor 40 which discharges through line 41 and valve 42 into line 12, already mentioned, through which the mixture of aromatic hydrocarbons and hydrogen is introduced to hydrogenation reactor 19. From gas separator 35 the ethyl benzene fraction is withdrawn through line 43, valve 44, cooler 45, line 46, and valve 47 to storage or to further use as desired.

According to the process of the present invention hydrogen is used essentially as a tool for effecting the separation of ethyl benzene from isomeric xylenes. Since the hydrogenation and dehydrogenation reactions used in this process are accompanied by relatively low losses due to decomposition, cracking, or other undesirable side reactions, a highly efficient separation of ethyl benzene is effected.

The following example is introduced to illustrate the results normally expected from the process, although this example is not presented with the intention of unduly limiting the broad scope of the invention.

A hydrocarbon mixture formed by dehydrocyclization of 100 parts by weight of normal octane in the presence of a chromia-alumina catalyst and consisting of approximately 15 parts by weight of ethyl benzene, 35 parts by weight of a xylene mixture containing about equal amounts of o-, m-, and p-xylenes, 10 parts by weight of octenes, and 20 parts by weight of unconverted octane is fractionally distilled and separated into an octane-octene fraction, a mixture comprising essentially ethyl benzene and m- and p-xylenes, and a residue consisting of substantially pure o-xylene. One molecular proportion of said mixture comprising essentially ethyl benzene and m- and p-xylenes is commingled with 4 molecular proportions of hydrogen and the commingled mixture is passed at 150° C. under a pressure of 20 atmospheres through a reactor containing a fixed bed of hydrogenation catalyst comprising approximately 65% by weight of reduced nickel and 35% by weight of diatomaceous earth. Hydrogenation to ethyl cyclohexane and di-methyl cyclohexanes is substantially complete after one pass over the catalyst when approximately 1 volume of liquid aromatic hydrocarbon mixture is charged per hour through 1 volume of the nickel-diatomaceous earth catalyst.

Fractional distillation of the hydrogenation product separates approximately 14 parts by weight of substantially pure ethyl cyclohexane from a mixture containing about 24 parts by weight of di-methyl cyclohexanes and 1 part by weight of ethyl cyclohexane. Passage of the substantially pure ethyl cyclohexane fraction over a composite comprising essentially 8% by weight of chromium sesquioxide and 92% by weight of alumina at 500° C. under substantially atmospheric pressure using an ethyl cyclohexane charging rate corresponding to a liquid space velocity of 1 gives substantially complete conversion into ethyl benzene and hydrogen, the latter being compressed and recycled to commingle with the mixture of ethyl benzene, m- and p-xylenes, and added hydrogen being conducted to the hydrogenation stage of the process.

The nature of the present invention and its commercial utility are evident from the specification and example given, although neither section is intended to unduly limit its generally broad scope.

I claim as my invention:

1. A process for separating ethyl benzene from a mixture comprising essentially ethyl benzene and isomeric xylenes which comprises fractionally distilling said mixture to remove a relatively lower boiling fraction containing m- and p-xylenes and ethyl benzene from a residue of higher boiling o-xylene, subjecting said relatively lower boiling fraction to catalytic hydrogenation to form a naphthenic hydrocarbon mixture including ethyl cyclohexane and dimethyl cyclohexanes, separating said naphthenic hydrocarbon mixture by distillation into dimethyl cyclohexanes and an ethyl cyclohexane fraction, and catalytically dehydrogenating said ethyl cyclohexane fraction to give ethyl benzene.

2. A process for separating ethyl benzene from a mixture comprising essentially ethyl benzene, m-xylene, and p-xylene which comprises subjecting said mixture to catalytic hydrogenation to form a naphthenic hydrocarbon mixture including ethyl cyclohexane and dimethyl cyclohexanes, separating said naphthenic hydrocarbon mixture by distillation into a dimethyl cyclohexane fraction and an ethyl cyclohexane fraction, catalytically dehydrogenating said ethyl cyclohexane fraction to give ethyl benzene and a hydrogen-containing gas, and recycling said hydrogen-containing gas to further use in the hydrogenation of an additional quantity of the mixture being charged to the hydrogenation step of the process.

3. A process for separating ethyl benzene from a mixture comprising essentially ethyl benzene, m-xylene, and p-xylene which comprises subjecting said mixture to catalytic hydrogenation to form a naphthenic hydrocarbon mixture including ethyl cyclohexane and dimethyl cyclohexanes, separating said naphthenic hydrocarbon mixture by distillation into an ethyl cyclohexane fraction and a dimethyl cyclohexane fraction, separately catalytically dehydrogenating said ethyl cyclohexane fraction and said dimethyl cyclohexane fraction to give ethyl benzene, a mixture of m- and p-xylenes and a hydrogen-containing gas, and recycling said hydrogen-containing gas to further use in the hydrogenation of an additional quantity of the mixture being charged to the hydrogenation step of the process.

4. A process for separating ethyl benzene from a mixture comprising essentially ethyl benzene and isomeric xylenes which comprises fractionally distilling said mixture to remove a relatively lower boiling fraction containing m- and p-xylenes and ethyl benzene from a residue of higher boiling o-xylene, subjecting 1 molecular proportion of said relatively lower boiling fraction and at least 3 molecular proportions of hydrogen to contact with a hydrogenating catalyst under conditions of temperature and pressure adequate to form a naphthenic hydrocarbon mixture including ethyl cyclohexane and di-methyl cyclohexanes, separating said naphthenic hydrocarbon mixture by distillation into dimethyl cyclohexanes and an ethyl cyclohexane fraction, catalytically dehydrogenating said ethyl cyclohexane fraction to give ethyl benzene and a hydrogen-containing gas, and recycling said hydrogen-containing gas to further use in the hydrogenation of an additional quantity of the fraction comprising essentially m- and p-xylenes and ethyl benzene being charged to the hydrogenation step of the process.

5. A process for separating ethyl benzene from a mixture comprising essentially ethyl benzene and isomeric xylenes which comprises fractionally distilling said mixture to remove a relatively lower boiling fraction containing m- and p-xylenes and ethyl benzene from a residue of higher boiling o-xylene, subjecting 1 molecular proportion of said relatively lower boiling fraction and at least 3 molecular proportions of hydrogen to contact with a hydrogenating catalyst under conditions of temperature and pressure adequate to form a naphthenic hydrocarbon mixture including ethyl cyclohexane and dimethyl cyclohexanes, separating said naphthenic hydrocarbon mixture by distillation into dimethyl cyclohexanes and an ethyl cyclohexane fraction, subjecting said ethyl cyclohexane fraction to contact with a nickel-containing catalyst at a temperature of from about 250° to about 600° C. to form ethyl benzene and a hydrogen-containing gas, and recycling said hydrogen-containing gas to further use in the hydrogenation of an additional quantity of the fraction comprising essentially m- and p-xylenes and ethyl benzene being charged to the hydrogenation step of the process.

6. A process for separating ethyl benzene from a mixture comprising essentially ethyl benzene, m-xylene, and p-xylene which comprises subjecting 1 molecular proportion of said mixture and at least 3 molecular proportions of hydrogen to contact with a dehydrogenating catalyst under conditions of temperature and pressure adequate to form a naphthenic hydrocarbon mixture including ethyl cyclohexane and dimethyl cyclohexanes, separating said naphthenic hydrocarbon mixture by distillation into a dimethyl cyclohexane fraction and an ethyl cyclohexane fraction, catalytically dehydrogenating said ethyl cyclohexane fraction to give ethyl benzene and a hydrogen-containing gas, and recycling said hydrogen-containing gas to further use in the hydrogenation of an additional quantity of the mixture being charged to the hydrogenation step of the process.

7. A process for separating ethyl benzene from a mixture comprising essentially ethyl benzene and isomeric xylenes which comprises fractionally distilling said mixture to remove a relatively lower boiling fraction containing m- and p-xylenes and ethyl benzene from a residue of higher boiling o-xylene, subjecting 1 molecular proportion of said relatively lower boiling fraction and at least 3 molecular proportions of hydrogen to contact with a hydrogenating catalyst under conditions of temperature and pressure adequate to form a naphthenic hydrocarbon mixture including ethyl cyclohexane and dimethyl cyclohexanes, separating said naphthenic hydrocarbon mixture by distillation into dimethyl cyclohexanes and an ethyl cyclohexane fraction, subjecting said ethyl cyclohexane fraction to contact with a composite of a major proportion of a carrier and a relatively smaller proportion of an oxide of an element selected from the members of the left-hand column of group V of the periodic table to form ethyl benzene and a hydrogen-containing gas, and recycling said hydrogen-containing gas to further use in the hydrogenation of an additional quantity of said relatively lower boiling fraction containing m- and p-xylenes and ethyl benzene being charged to the hydrogenation step of the process.

8. A process for separating ethyl benzene from a mixture comprising essentially ethyl benzene and isomeric xylenes which comprises fractionally distilling said mixture to remove a relatively lower boiling fraction containing m- and p-xylenes and ethyl benzene from a residue of higher boiling o-xylene, subjecting 1 molecular proportion of said relatively lower boiling fraction and at least 3 molecular proportions of hydrogen to contact with a hydrogenating catalyst under conditions of temperature and pressure adequate to form a naphthenic hydrocarbon mixture including ethyl cyclohexane and dimethyl cyclohexanes, separating said naphthenic hydrocarbon mixture by distillation into dimethyl cyclohexanes and an ethyl cyclohexane fraction, subjecting said ethyl cyclohexane fraction to contact with a composite of a major proportion of a carrier and a relatively smaller proportion of an oxide of an element selected from the members of the left-hand column of group VI of the periodic table to form ethyl benzene and a hydrogen-containing gas, and recycling said hydrogen-containing gas to further use in the hydrogenation of an additional quantity of said relatively lower boiling fraction containing m- and p-xylenes and ethyl benzene being charged to the hydrogenation step of the process.

9. A process for separating ethyl benzene from a mixture comprising essentially ethyl benzene and isomeric xylenes which comprises fractionally distilling said mixture to remove a relatively lower boiling fraction containing m- and p-xylenes and ethyl benzene from a residue of higher boiling o-xylene, subjecting 1 molecular proportion of said relatively lower boiling fraction and at least 3 molecular proportions of hydrogen to contact with a hydrogenating catalyst under conditions of temperature and pressure adequate to form a naphthenic hydrocarbon mixture including ethyl cyclohexane and m- and p-dimethyl cyclohexanes, separating said naphthenic hydrocarbon mixture by distillation into an ethyl cyclohexane fraction and a dimethyl cyclohexane fraction, separately catalytically dehydrogenating said ethyl cyclohexane fraction and said dimethyl cyclohexane fraction in the presence of a composite of a major proportion of alumina and a relatively smaller proportion of an oxide of chromium to give ethyl benzene, a mixture of m-xylene and p-xylene, and a hydrogen-containing gas, and recycling said hydrogen-containing gas to further use in the hydrogenation of an additional quantity of said relatively lower boiling fraction containing m- and p-xylenes and ethyl benzene being charged to the hydrogenation step of the process.

WILLIAM J. MATTOX.